United States Patent [19]

Davey

[11] Patent Number: 4,964,234
[45] Date of Patent: Oct. 23, 1990

[54] FISHING AID

[76] Inventor: Brian I. Davey, 278 Barbet Road, Benoni, Transvaal, South Africa

[21] Appl. No.: 374,872

[22] Filed: Jul. 3, 1989

[30] Foreign Application Priority Data

Jul. 5, 1988 [ZA] South Africa ................. 88/4778
Aug. 11, 1988 [ZA] South Africa ................. 88/5927

[51] Int. Cl.$^5$ ............................................. A01K 85/00
[52] U.S. Cl. ............................................. 43/44.2
[58] Field of Search .................. 43/44.2, 44.4, 44.8, 43/42.39

[56] References Cited

U.S. PATENT DOCUMENTS

| | | | |
|---|---|---|---|
| 2,735,214 | 2/1956 | Stenseng | 43/44.4 |
| 3,344,549 | 10/1957 | Peters et al. | 43/42.39 |
| 4,189,860 | 2/1980 | Ebert | 43/44.4 |
| 4,471,558 | 9/1984 | Garcia | 43/44.8 |
| 4,713,907 | 12/1987 | Dudeck | 43/42.39 |

Primary Examiner—M. Jordan

[57] ABSTRACT

This invention relates to a fishing aid, comprising a body having a nose and a tail defining a keel. An attachment point is provided in the body for suspending it from a towing line. A headpin or similar securing means is provided for securing a baitfish by its snout to the body so that the baitfish is towed behind the body when the body is towed through the water by the towing line. A water impingement surface extends upwardly and rearwardly from the nose of the body. An underslung mass is provided below the attachment point on the body, and is so arranged in relation to the attachment point, the water impingement surface and the headpin that, when towed through the water, the body is oriented so that the water impingement surface faces upwardly, and is impinged upon by the water, which imparts life-like movements to the body. These movements are transmitted to the baitfish to cause the baitfish to execute a swimming-like motion through the water.

12 Claims, 1 Drawing Sheet

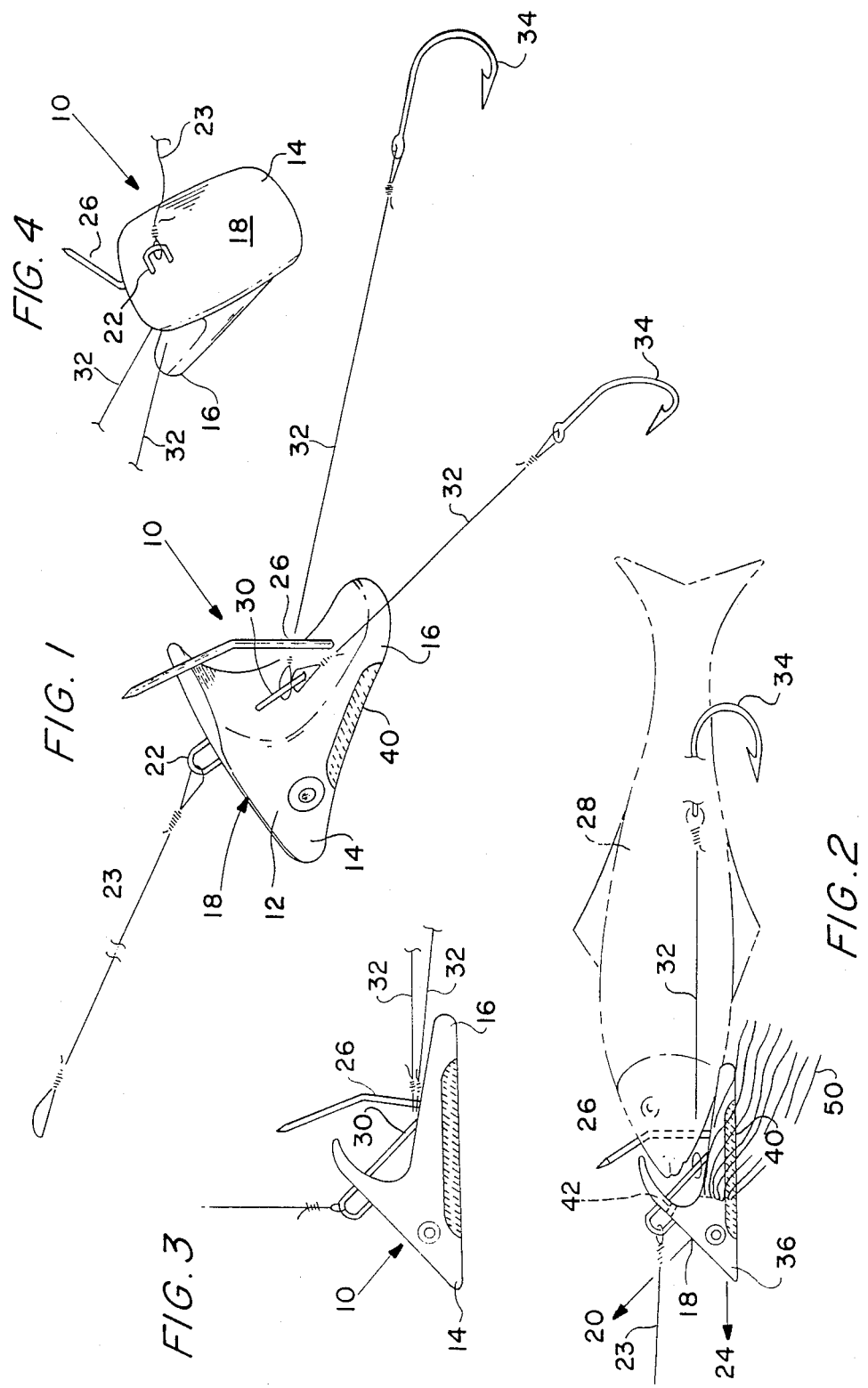

FISHING AID

BACKGROUND TO THE INVENTION

THIS invention relates to a fishing aid.

It is generally acknowledged that the best form of bait for certain fish is live bait. However, the acquisition of suitable live bait is not always easy or economical. As a less preferred option, some fishermen will use a dead baitfish. Dead baitfish is generally less preferred because predator fish are usually not as attracted to dead bait as they are to live bait. Attempts have been made to design "bait swimmers" where the intention is to cause a dead baitfish to "swim" in the manner of a live fish but unfortunately none of the known designs has proved successful in practice at a variety of trolling speeds.

An even less preferred option is artificial bait, usually in the form of an artificial fish. While artificial bait of this kind may include the facility to give the bait the appearance of a live, swimming fish, artificial bait is expensive and not always successful, primarily because it does not have a natural smell.

SUMMARY OF THE INVENTION

According to the invention, there is provided a fishing aid comprising:

(a) a body having a nose and a tail defining a keel;

(b) an attachment point on the body to which a towing line is attachable to suspend the body on the towing line;

(c) a water impingement surface on the body;

(d) means on the body for securing thereto the snout of a baitfish so that the baitfish is towed behind the body when the body is towed through water by the towing line; and (e) an underslung mass provided by the body below the attachment point, the mass being so arranged in relation to the attachment point, water impingement surface and snout secural means that the body when suspended on the towing line is orientated for its water impingement surface to be inclined upwardly relative to the horizontal and for the nose and tail of the body to be aligned generally horizontally, the water impingement surface when the suspended body is towed through water by the towing line being impinged upon by the water, the water imparting movements to the body during such towing which are transmitted to the baitfish to cause the baitfish to execute a naturally orientated, swimming-like motion through the water.

It is preferred that the means for securing the snout of the baitfish to the body comprises a headpin which stands upright when the body is suspended on the towing line and which can pierce the snout of the baitfish to secure the baitfish to the body while permitting side-to-side pivotal movement of the snout relative to the body. The headpin should be so orientated as to stand substantially vertically during towing such that the baitfish is maintained at a correct orientation. However, if the body is merely suspended on the towing line, the headpin may be inclined at a small angle to the vertical such that it is brought to a condition of verticality when towing commences and water impinges on the water impingement surface. The headpin may be connected to the tail so as to extend upwardly with its upper end cranked.

According to another preferred feature of the invention, the body provides a concavity for receiving the snout of the baitfish, the concavity being defined by the underside of the water impingement surface and the tail and being open to both sides to permit side-to-side pivotal movement of the snout relative to the body.

The water impingement surface may be substantially flat. Preferably, eyes are painted or otherwise applied to the body in the vicinity of the nose. Preferably also, the body carries light-reflective material thereon, typically a reflective paint.

The body may have lines attached to it which carry hooks at their remote ends for engaging the body of the baitfish.

BRIEF DESCRIPTION OF THE DRAWINGS

The invention will now be described in more detail, by way of example only, with reference to the accompanying drawings in which:

FIG. 1 shows a rear perspective view of a fishing aid according to the invention;

FIG. 2 shows a side elevation of the fishing aid in use;

FIG. 3 shows a side elevation of the fishing aid when merely suspended at the end of a towing line; and FIG. 4 shows a front perspective view of the fishing aid.

DESCRIPTION OF A PREFERRED EMBODIMENT

The fishing aid 10 seen in the drawings includes a body 12 made of a lead alloy. The body 12 has a nose 14 and a tail 16. The forward end of the body is provided with a generally flat water impingement surface 18 which extends up upwardly and rearwardly from the nose 14 as illustrated. The body 10 is also provided with an attachment point for a towing line 23. In the illustrated embodiment, the attachment point is provided by a wire towing eye 22 which projects from the surface 18 as illustrated. The towing line 23 is tied to the towing eye 22 and can be used to tow the body in a forward towing direction indicated in FIG. 2 by the numeral 24. A head pin 26 is connected to the upper surface of the tail 16 and has a sharp upper end. In the illustrated embodiment, the headpin 26 is cranked at a point roughly mid-way between the tail 16 and the sharp upper end, but in other embodiments the headpin may be straight.

A length of wire 30 has its ends cast into the body 12 so as to span between a position beneath the generally flat water impingement surface 18 and the tail 16. Lines 32 carrying hooks 34 at their free ends are secured to the length of wire 30. As an alternative to the provision of a separate towing eye 22 as illustrated, it would also be possible to form a passage (42 in FIG. 2) through which the towing line 23 could be passed for direct attachment to the wire 30.

In use, a dead baitfish 28 is attached to the body 12 by piercing the snout of the fish with the headpin 26. As is particularly clear in FIG. 2, the underside of the water impingement surface 18 and the tail 16 define between them a concavity which receives the pierced snout of the dead fish 28. The hooks 34 are engaged with the flanks of the fish's body. With this attachment arrangement, the snout of the fish is free to pivot about the headpin 26, the concavity mentioned above being open at the sides to permit such pivotting.

With the fishing aid 10 towed behind a boat using the towing line 23, the dead bait fish 28 trails behind the body 12 at a natural, upright attitude. FIG. 2 shows the fishing aid during towing and illustrates that the water impingement surface 18 faces forwardly and upwardly during towing. As the body 12 moves through the water, the water impinges on surface 18, causing the body 12 to wobble or flutter slightly with an irregular movement. The movements of the body, and hence of the pin 26, are transmitted to the snout of the bait fish 28. The snout therefore executes a corresponding movement and this movement is transferred along the length of the fish. Given the overall length of the bait fish 28, a relatively small movement of the pin 26 will cause relatively large movements at the fish's tail. The overall flexural movement of the bait fish 28 is akin to that of a live, swimming fish.

A very important feature of the illustrated embodiment is the weight distribution in the body 12. The nose 14 and tail 16, and the material between the nose and the tail, defining a keel, constitutes a mass which is underslung relative to the water impingement surface 18 and the towing eye 22. Referring to FIG. 3, it will be seen that when the body 12 is merely suspended at the end of a vertical line, its natural orientation is such that the nose 14 and tail 16 are aligned in a generally horizontal direction, with the water impingement surface 18 facing forwardly and upwardly. At this natural orientation, the lower part of the headpin 26 is rearwardly inclined at a small angle to the vertical.

It is known that a dead fish will merely wallow in water with no substantial tendency to rise or sink and with no preferred orientation. It is for this reason that a dead fish is readily recognisable to a predator fish who would, in any event, prefer to attack a live fish. With the distribution of weight in the body 12, a dead fish whose snout is pierced by the head pin 26 will be brought to a substantially horizontal orientation, the correct way up, and this will appeal to the predator fish as the orientation of a live fish. When towing of the body 12 does commence, the force of water impinging on the water impingement surface 18 will cause the nose 14 to dip slightly and will bring the lower part of the headpin 26 to a substantially vertical attitude. In the result, the dead bait fish 28 will "swim" at a substantially horizontal attitude and be maintained at the correct, upright attitude.

It will thus be appreciated that the bait fish will be held at the natural orientation of a live fish, irrespective of whether the body 12 is stationary in the water or whether it is being towed, and irrespective of the towing speed. This feature is a marked improvement over some earlier proposals where no attention was paid to weight distribution and the bait fish would merely hang vertically in the water at all but a limited range of towing speeds.

The body 12 of the illustrated fishing aid 10 is painted in any one of a variety of colours which are considered attractive to predator fish. The paint which is used may contain a reflective component. The importance of a reflective component resides in the fact that fish are known to have a so-called "lateral line" which causes a marginal change in the fish's colour if the fish, for instance, feels terror as a result of the impending attack of a predator fish. This marginal change in colour is seen by the predator fish and indicates to it which is a suitable target fish. It is believed that, with a reflective component in the paint used for the body 12, light falling on the body will create a shimmering or flashing effect which will be seen by a predator fish as a marginal change in colour due to the action of the target fish's lateral line.

As an alternative to a reflective component in the paint used for the body 12, the body may carry a reflective strip 40 on the underside of the underslung mass. It is believed that the function of such a reflective strip would be similar to that of a reflective component in the paint.

Eyes are painted on the body 12 on either side in the vicinity of the nose 14. In the painted eyes, the sclera are painted a yellow colour similar to the sclera of a live fish's eyes. The eyes of the dead bait fish 28 will be rather duller than the eyes of a live fish, and it is believed that the provision of painted eyes on the body 12 could help in persuading a predator fish that the bait fish 28 is a live fish.

In other embodiments of the invention, the nose 14 may be substantially longer than the nose 14 illustrated in the drawings, and may in fact protrude forwardly in the manner of a spike. The intention in this case would be to give predator fish the impression of a target fish having a spiked snout.

The fishing aid 10 may include a further feature in the form of a "skirt" 50 as shown in broken outline in FIG. 3. The skirt 50 is composed of flexible tassels which it is believed may appeal to some predator fish.

I claim:

1. A fishing aid comprising:
   (a) a body having a nose and a tail defining a keel;
   (b) an attachment point on the body to which a towing line is attachable to suspend the body on the towing line;
   (c) a water impingement surface on the body;
   (d) means on the body for securing thereto the snout of a baitfish so that the baitfish is towed behind the body when the body is towed through water by the towing line; and
   (e) an underslung mass provided by the body below the attachment point, the mass being so arranged in relation to the attachment point, water impingement surface and snout secural means that the body when suspended on the towing line is orientated for its water impingement surface to be inclined upwardly relative to the horizontal and for the nose and tail of the body to be aligned generally horizontally, the water impingement surface when the suspended body is towed through water by the towing line being impinged upon by the water, the water imparting movements to the body during such towing which are transmitted to the baitfish to cause the baitfish to execute a naturally orientated, swimming-like motion through the water.

2. A fishing aid according to claim 1 wherein the means for securing the snout of the baitfish to the body comprises a headpin which stands uprights when the body is suspended on the towing line and which can pierce the snout of the baitfish to secure the baitfish to the body while permitting side-to-side pivotal movement of the snout relative to the body.

3. A fishing aid according to claim 2 wherein the headpin stands substantially vertically during towing.

4. A fishing aid according to claim 3 wherein the headpin is inclined at a small angle to the vertical when merely suspended on the towing line.

5. A fishing aid according to of claim 2 wherein the headpin has an operatively lower end connected to the tail of the body and extends upwardly from the tail.

6. A fishing aid according to claim 5 wherein the operatively upper end of the headpin is cranked.

7. A fishing aid according to claim 1 wherein the body provides a concavity for receiving the snout of the baitfish, the concavity being defined by the underside of the water impingement surface and the tail and being open to both sides to permit side-to-side pivotal movement of the snout relative to the body.

8. A fishing aid according to claim 1 wherein the water impingement surface is substantially flat.

9. A fishing aid according to claim 1 wherein the body is made of a lead alloy.

10. A fishing aid according to claim 1 wherein representations of eyes are applied to the body in the vicinity of the nose of the body.

11. A fishing aid according to claim 1 wherein the body carries light-reflective material thereon.

12. A fishing aid according to claim 1 wherein the body has lines attached to it, the lines carrying hooks at their ends remote from the body for engaging the body of the baitfish.

* * * * *